United States Patent
Ionescu et al.

(10) Patent No.: US 11,200,478 B2
(45) Date of Patent: Dec. 14, 2021

(54) SECURITY DEVICE FOR PRODUCT PACKAGING

(71) Applicant: Hewlett-Packard Development Company, L.P., Spring, TX (US)

(72) Inventors: Robert Ionescu, Palo Alto, CA (US); Ning Ge, Palo Alto, CA (US); Helen A. Holder, Palo Alto, CA (US); Jarrid Wittkopf, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/760,951

(22) PCT Filed: Jan. 25, 2018

(86) PCT No.: PCT/US2018/015241
§ 371 (c)(1),
(2) Date: May 1, 2020

(87) PCT Pub. No.: WO2019/147246
PCT Pub. Date: Aug. 1, 2019

(65) Prior Publication Data
US 2020/0364530 A1    Nov. 19, 2020

(51) Int. Cl.
*G06K 19/077* (2006.01)
*B65D 5/20* (2006.01)
*B65D 5/42* (2006.01)
*G06K 7/10* (2006.01)
*G06K 19/07* (2006.01)

(52) U.S. Cl.
CPC ......... *G06K 19/07773* (2013.01); *B65D 5/20* (2013.01); *B65D 5/4212* (2013.01); *G06K 7/10366* (2013.01); *G06K 19/0723* (2013.01)

(58) Field of Classification Search
CPC ......... G06K 19/07773; G06K 7/10366; G06K 19/0723; G06K 7/10009; G06K 19/07758; G06K 19/07794; G06K 19/07749; G06K 19/07737; B65D 5/20; B65D 5/4212
See application file for complete search history.

(56) References Cited

U.S. PATENT DOCUMENTS

| | | | |
|---|---|---|---|
| 5,831,531 A | 11/1998 | Tuttle | |
| 7,301,460 B2 | 11/2007 | Coste | |
| 9,697,711 B2 | 7/2017 | McIntosh | |
| 10,371,737 B2 * | 8/2019 | Mukherjee | ........ A61M 15/0026 |
| 2002/0067264 A1 | 6/2002 | Soehnlen | |
| 2007/0069895 A1 | 3/2007 | Koh | |

(Continued)

OTHER PUBLICATIONS

Want, R., Enabling Ubiquitous Sensing with RFID, Aug. 2, 2004, 3pgs, http://ieeexplore.ieee.org/document/1297315/.

*Primary Examiner* — Sonji N Johnson
(74) *Attorney, Agent, or Firm* — Fabian VanCott

(57) ABSTRACT

An RFID security device for product packaging is disclosed. The security device includes an RFID tag disposed on a first portion of a product package, and a booster antenna disposed on a second portion of the product package. The RFID tag and booster antenna are positioned on the product package so that the RFID tag will be electromagnetically coupled to the booster antenna when the product package is closed, and the RFID tag will be decoupled from the booster antenna when the product package is open.

20 Claims, 6 Drawing Sheets

(56) References Cited

U.S. PATENT DOCUMENTS

| | | |
|---|---|---|
| 2008/0068178 A1 | 3/2008 | Meyer |
| 2008/0309495 A1 | 12/2008 | Chisholm |
| 2013/0119144 A1* | 5/2013 | Suzuki ............ G06K 19/07767 235/492 |
| 2017/0363673 A1 | 12/2017 | Mukherjee |
| 2017/0364716 A1 | 12/2017 | Huhtasalo et al. |
| 2019/0138766 A1* | 5/2019 | Colby ................ G06K 7/10316 |

* cited by examiner

100

400

SECURITY DEVICE FOR PRODUCT PACKAGING

BACKGROUND

Radio Frequency Identification (RFID) tags are commonly used in various contexts such as product identification, inventory tracking, product security, and others. In a typical system, an RFID tag may be affixed to product packaging and encoded with product related information such as a product serial number, stock number, production date, and other identifying information. To read the tag, an RFID reader transmits a wireless signal to the RFID tag. In response to the wireless signal, the RFID tag wirelessly transmits its stored information to the RFID reader. The RFID reader is able to read the information from several RFID tags simultaneously, and may be configured to transmit responses to a computer system, which can use the information to track the product inventory.

DESCRIPTION OF THE DRAWINGS

Certain examples are described in the following detailed description and in reference to the drawings, in which.

DETAILED DESCRIPTION

Techniques for detecting package tampering are disclosed. The system includes an RFID tag and booster antenna disposed on the package. The booster antenna boosts the effective communication range of the RFID tag. The booster antenna is disposed on one portion of the package, and the RFID tag is coupled to another portion of the package such that the RFID tag is inductively coupled to the booster antenna when the package is closed. When the package is opened, the RFID tag is decoupled from the booster antenna and the RFID reader loses communication with the RFID tag. This can be registered as a tampering event. When the package is opened, the RFID tag remains functional but has a reduced communication range. Resealing the package recouples the RFID tag and booster antenna so that normal operation of the RFID security system can resume.

Figure 1:
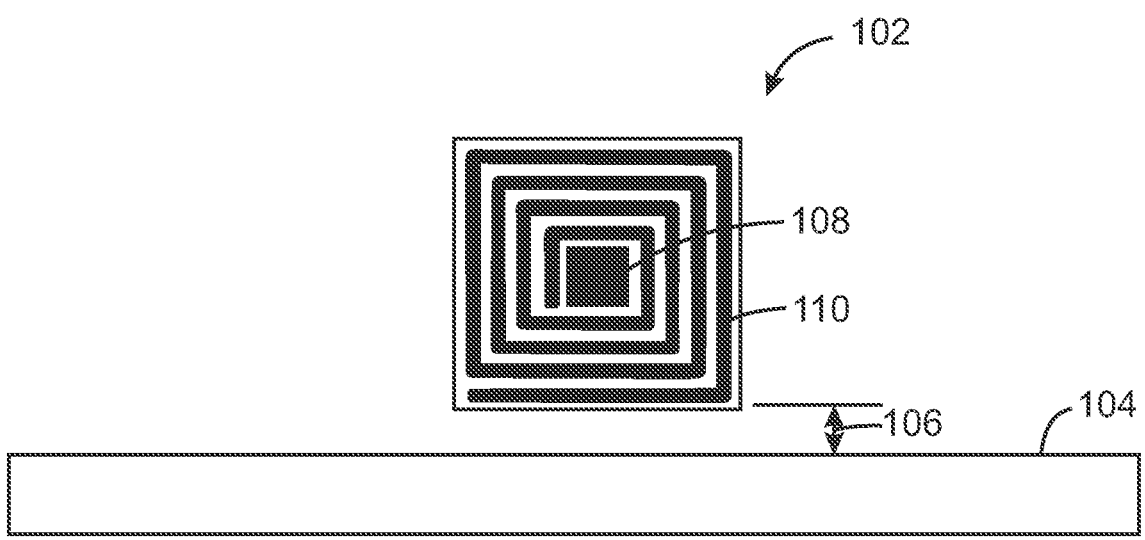
FIG. 1 is a diagram of as security device disposed on a product package.

FIG. 1 is a diagram of as security device disposed on a product package. The security device 100 includes an RFID tag 102 and booster antenna 104. Although not shown in FIG. 1, the RFID tag 102 and booster antenna 104 are disposed on different portions of a package that are movable relative to one another. The relative positions of the RFID tag 102 and booster antenna 104 shown in FIG. 1 occur when the package is closed such that the two portions of the package cause the RFID tag 102 and booster antenna 104 to be aligned. The alignment of the RFID tag 102 and booster antenna 104 cause the RFID tag 102 and booster antenna 104 to be electromagnetically coupled. As used herein, the term "electromagnetically coupled" refers to an inductive or capacitive coupling, as opposed to a conductive coupling. The edge-to-edge spacing 106 between the RFID tag 102 and the booster antenna 104 may be less than approximately 0.25 millimeters (mm) when the package is closed. In some examples, the RFID tag 102 and the booster antenna 104 may fully or partially overlap when the package is closed.

The RFID tag 102 includes an integrated circuit 108 and an antenna 110 conductively coupled to the integrated circuit 108 to enable the integrated circuit 108 to communicate wireless with an RFID reader. The RFID tag 102 may be active or passive. The integrated circuit 108 can include a non-volatile memory for storing various information, such as a unique tag serial number and product related information. The antenna 110 included in the RFID tag 102 enables the RFID tag 102 to communicate with the RFID reader over a short range of distances. For example, the communication range may be approximately 0 to 20 centimeters (cm) for the RFID tag 102 alone, i.e. without the booster antenna 104.

In some examples, the RFID tag 102, including the antenna 110 and integrated circuit 108, may be formed together as discrete unit and then coupled to the package using an adhesive. Other techniques are also possible. For example, the antenna 110 of the RFID tag 102 may be printed onto the package and the integrated circuit 108 can be applied to the package over the antenna 110 and coupled to the package by an adhesive. The RFID tag 102 may also be coated with a sealing layer. In some examples, the RFID tag 102 may be embedded within the material of the package. For example, if the package is made of corrugated cardboard, the RFID tag 102 may be disposed between the layers of cardboard.

The booster antenna 104, when electromagnetically coupled to the RFID tag 102, increases the effective communication range of the RFID tag 102. For example, the booster antenna 104 may increase the communication range to a distance of around 10 centimeters to 2 meters. The booster antenna 104 may be any suitable type of antenna, including a monopole, dipole, meander dipole, loop antenna, and others. The booster antenna 104 may be disposed on the package in any suitable manner. In some examples, the booster antenna 104 may be made of a metal foil coupled to the package substrate by an adhesive. In some examples, the booster antenna 104 may be formed by printing a conductive medium on the package substrate using any of several printing techniques such as, thermal ink jet printing, liquid electrophotographic printing, and others.

Figure 2:
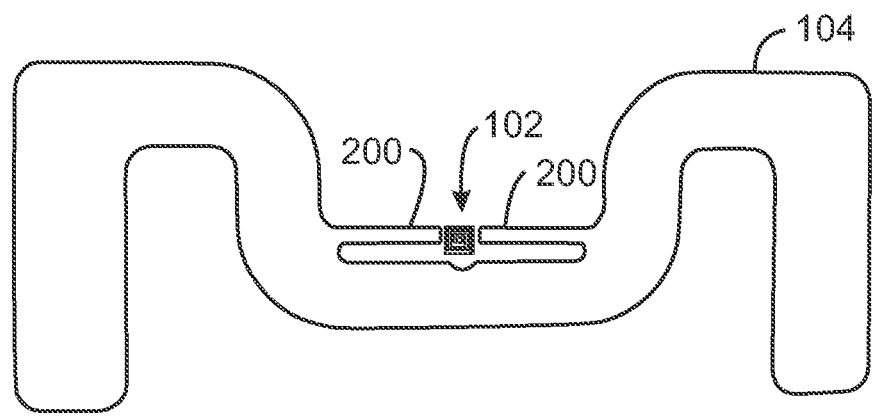
FIG. 2 is a diagram of another security device disposed on a product package.

FIG. 2 is a diagram of another security device disposed on a product package. As described in relation to FIG. 1, the RFID tag 102 and booster antenna 104 are disposed on different portions of package that are movable relative to one another. FIG. 2 shows the relative positions of the RFID tag 102 and booster antenna 104 when the package is in the closed position.

In the example shown in FIG. 2, the booster antenna 104 is a meander dipole. The bends in the booster antenna 104 reduce the footprint of the booster antenna 104 while maintaining a suitable resonant length. In this example, the booster antenna 104 also includes finger projections 200 to increase the coupling between the RFI tag and the booster antenna 104.

Figure 3:
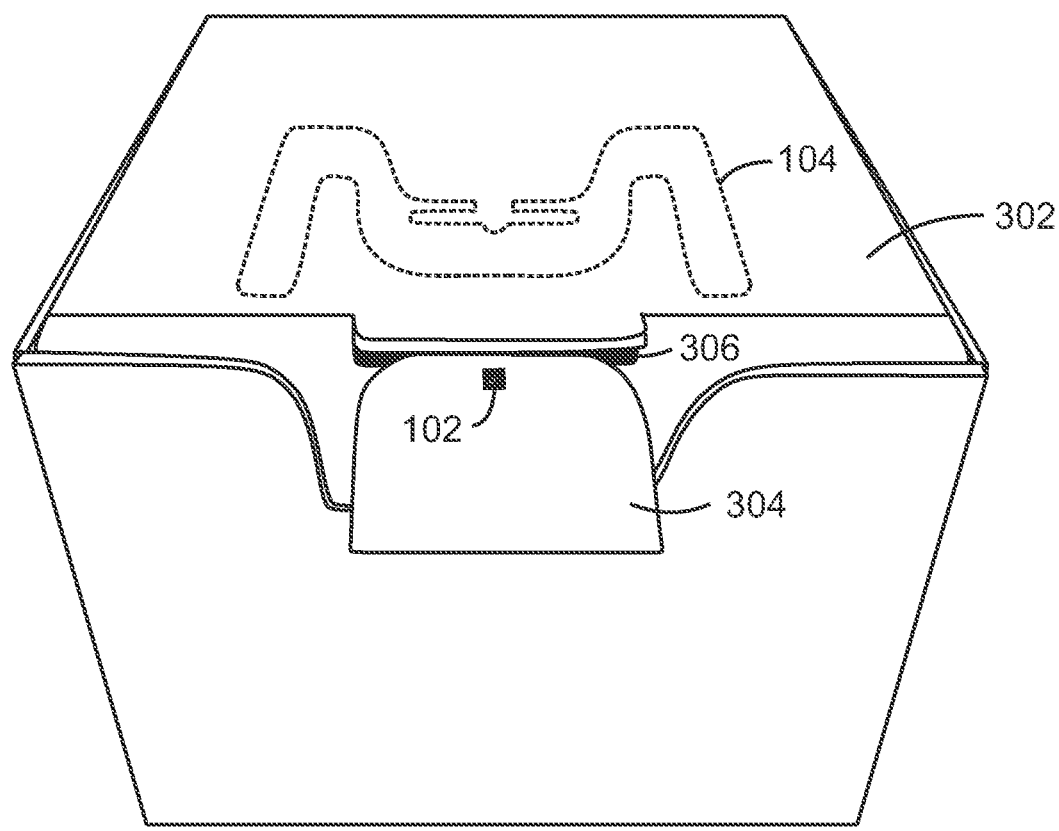
FIG. 3 is a perspective view of an example package with a security device that includes an RFID tag and booster antenna.

FIG. 3 is a perspective view of an example package with a security device that includes an RFID tag 102 and booster antenna 104. The example package shown in FIG. 3 is a box with an integrated lid 302 that folds over the top of the box. The body of the package 300 includes a tab 304 configured to mate with a slot 306 adjacent to the top surface of the lid 302. To fully close the package 300, the tab 304 is inserted into the slot 306. The open the package 300 without damaging it, the tab 304 must first be slid out from the slot 306.

As shown in FIG. 3, the RFID tag 102 may be disposed on a surface of tab 306, and the booster antenna 104 (shown with dotted lines) is disposed inside the box in the underside of the lid 302. When the tab 304 is inserted in the slot 306, the RFID tag 102 and booster antenna 104 will be in alignment as shown, for example, in FIG. 2. The alignment causes the RFID tag 102 to be electromagnetically coupled to the booster antenna 104, which increased the communication range of the RFID tag 102.

If the tab 304 is removed from the slot 306, the RFID tag 102 and booster antenna 104 become decoupled, which reduces the communication range of the RFID tag 102. The reduced communication range may cause an RFID reader to lose communication with the RFID tag 102. This loss of communication may indicate that the package 300 has been opened to access the package contents, and may be identified as a tampering event.

Although the RFID tag 102 may be unable to communicate with the RFID reader at long distances when the package 300 is in the opened state, the RFID tag 102 nevertheless remains operational. One advantage of the RFID tag 102 remaining operational is that the RFID tag 102 can still be used to identify and track the package 300. For example, an RFID reader may be brought to within a few centimeters of the RFID tag 102 to establish communicate with the RFID reader. Additionally, once the package 300 is reclosed, the RFID tag 102 becomes recoupled to the booster antenna 104 and is able to resume communications over the longer communication range. This may be useful, for example, if it can be confirmed that the product inside the package 300 is still present and unharmed.

The configuration shown in FIG. 3 is only one example configuration showing possible positions of the RFID tag 102 and booster antenna 104. It will be appreciated that other configurations are also possible. For example, the RFID tag 102 could be located on the bottom side of the tab 304 or embedded within the material of the tab 304. Similarly, the booster antenna 104 could be disposed on the top of the lid 302 or embedded within the material of the lid 302. The RFID tag 102 and booster antenna 104 may also be disposed on different portions of the package 300.

Figure 4:
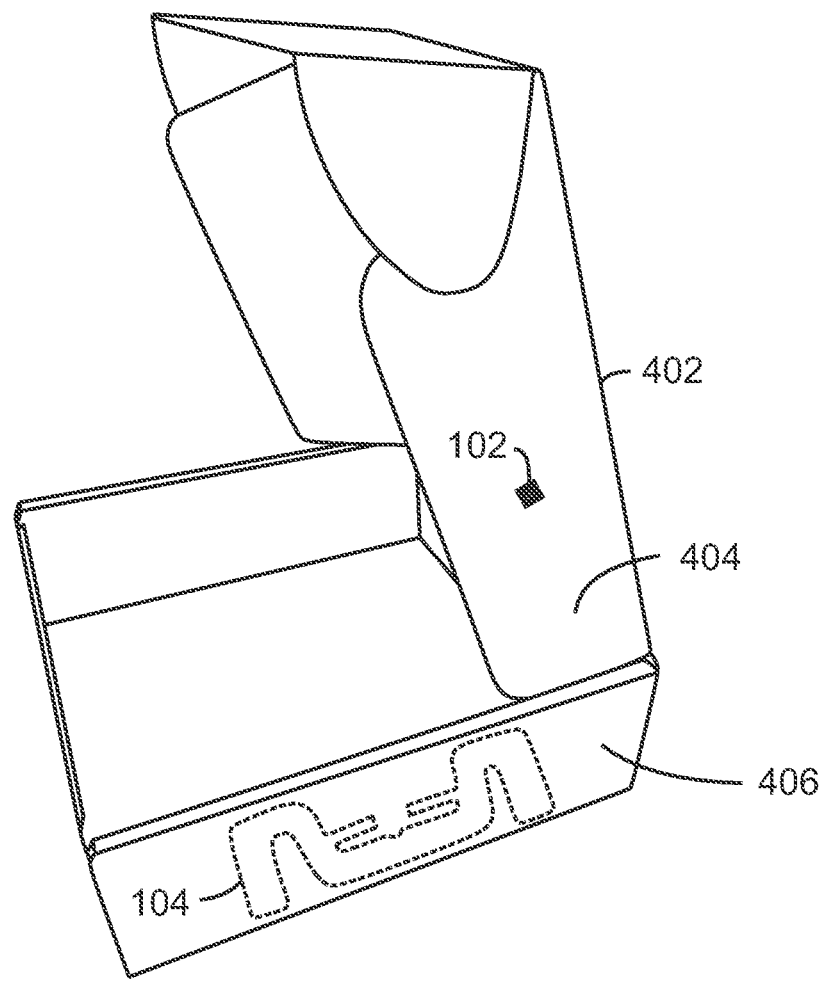
FIG. 4 is a perspective view of another example package with a security device that includes an RFID tag and booster antenna.

FIG. 4 is a perspective view of another example package with a security device that includes an RFID tag 102 and booster antenna 104. The example package shown in FIG. 4 is a box with an integrated lid 402 that folds over the top of the box. The sides of the lid 402 include flaps 404 that are configured to slide into the body of the package 400 in contact with the inside surface of the side wall of the package 400.

As shown in FIG. 2, the RFID tag 102 may be disposed on a surface of one or the flaps 404, and the booster antenna 104 (shown with dotted lines) is disposed inside the body of the package 400 on the side wall 406 of the package 400. When the package 400 is closed, the flap 404 is inserted into the package 400 and the RFID tag 102 and booster antenna 104 will be in alignment as shown, for example, in FIG. 2. The alignment causes the RFID tag 102 to be electromagnetically coupled to the booster antenna 104, which increases the communication range of the RFID tag 102.

If the package 400 is opened, the RFID tag 102 and booster antenna 104 become decoupled, which reduces the communication range of the RFID tag 102. As described in relation to FIG. 3, the reduced communication range may cause an RFID reader to lose communication with the RFID tag 102, which indicates that the package has been opened and may be identified as a tampering event. As mentioned above, although the RFID tag 102 may be unable to communicate with the RFID reader at long distances when the package 400 is in the opened state, the RFID tag 102 nevertheless remains operational, and once the package 400 is reclosed, the RFID tag 102 becomes recoupled to the booster antenna 104 and is able to resume communications over the longer communication range.

The configuration shown in FIG. 4 is only one example configuration showing possible positions of the RFID tag 102 and booster antenna 104. It will be appreciated that other configurations are also possible. For example, the RFID tag 102 could be located on the bottom side of the inside facing side of the flap or embedded within the material of the flap. Similarly, the booster antenna 104 could be disposed on the outward facing side of the sidewall or embedded within the material of the sidewall. The RFID tag 102 and booster antenna 104 may also be disposed on different portions of the package. For example, the RFID tag 102 can be disposed on the forward facing flap, and the booster antenna 104 could be disposed on the forward facing sidewall. Additionally, multiple RFID tag 102 and booster antenna 104 pairs may be disposed on various corresponding portions of the lid and base.

Figure 5:
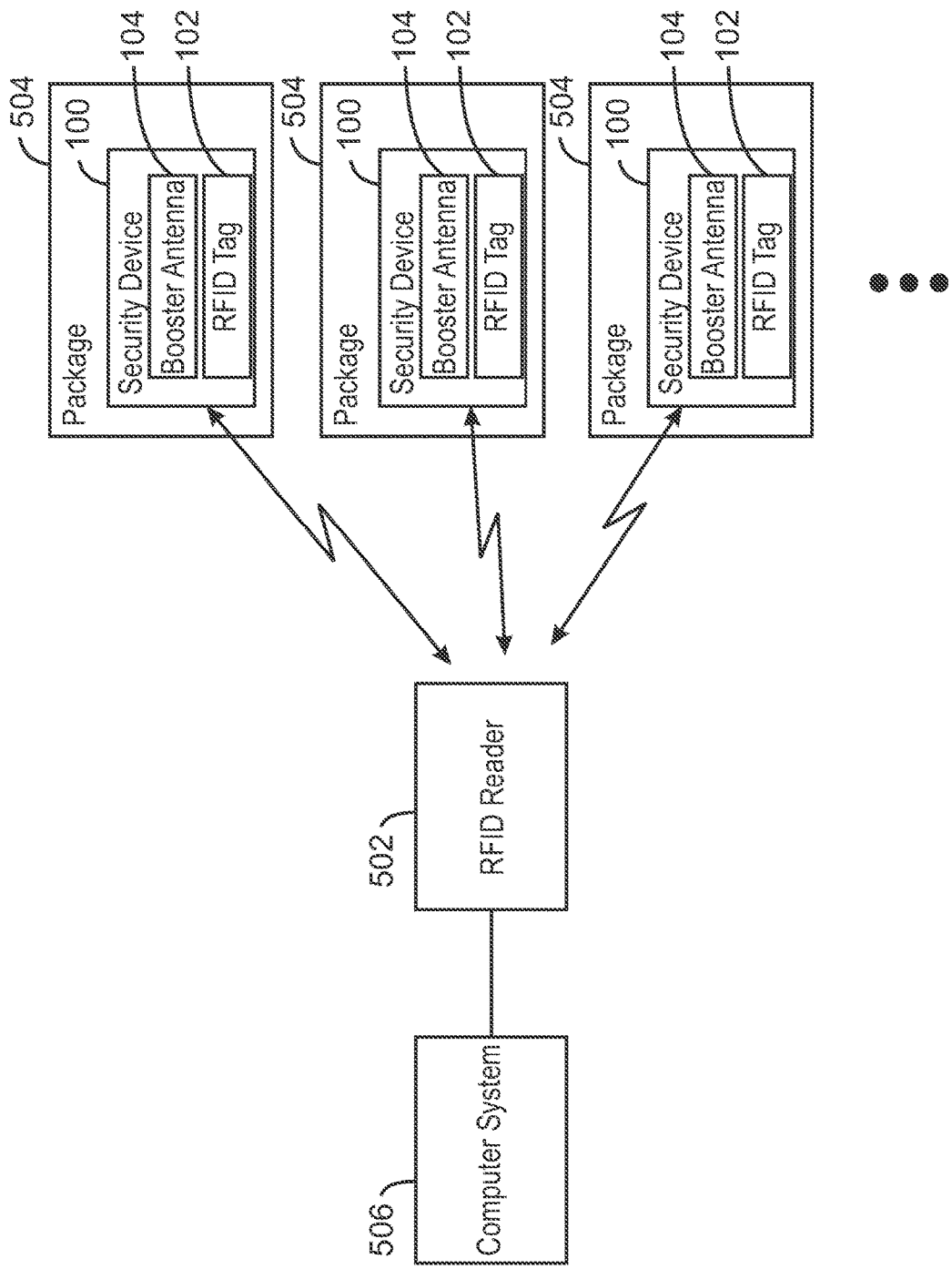
FIG. 5 is a block diagram of an RFID security system.

FIG. 5 is a block diagram of an RFID security system. The system includes an RFID reader 502 in wireless communication with a number of RFID tags 102. Each of the RFID tags 102 is a component of a security device 100 coupled to a package 504. Each security device 100 includes the RFID tag 102 and the booster antenna 104 as described above. The RFID reader 502 can maintain continuous communication with each of the RFID tags 102 by periodically broadcasting an interrogation signal. Each RFID tag 102 may respond to the interrogation signal by transmitting its unique identification code and, in some implementations, additional product-related information.

In some examples, the RFID reader 502 is also in communication with a computer system 506, which may be configured to collect and analyze data received from the RFID tags 102. The RFID reader 502 may be communicatively coupled to the RFID reader 502 through any suitable communication network, including wired connections, wireless connections, an Ethernet network, a WiFi network, the Internet, and others.

The computer system 506 may be configured to track inventory in any type of facility, such as a retail environment, and/or a storage facility such as warehouse, for example. The computer system 506 may also be coupled to additional RFID readers 502 within communication range of additional RFID tags 102 to provide coverage over a wider area.

In some examples, the computer system 506 is configured to detect product tampering. As described above, each of the RFID tags 102 will be within communication range of the RFID reader 502 while the package is closed. If any of the packages 504 is opened, the RFID tag 102 will be decoupled from its corresponding booster antenna 104, and the RFID reader 502 will stop receiving responses from the RFID tag 102. The resulting loss of communication can be flagged as a potential tampering event for the product associated with the RFID tag 102. This tampering event can be recorded by the computer system 506. In some examples, the computer system 506 may be configured to issue an alert to a staff member at the facility. If the package is reclosed, the RFID reader 502 may resume communication with the RFID tag 102. However, the tampering event will still be recorded, allowing a person to inspect the package to ensure product integrity.

Figure 6:
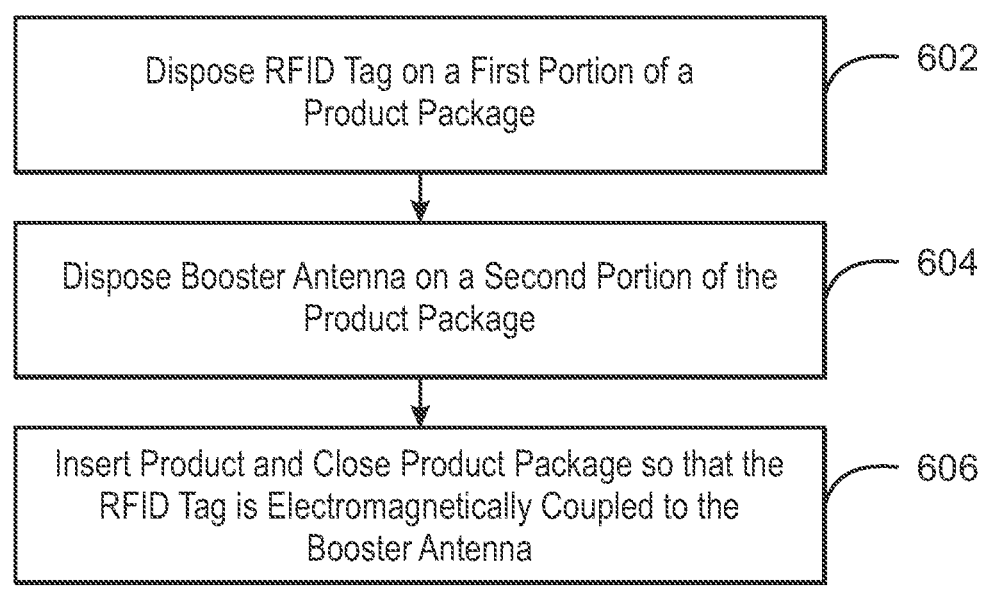
FIG. 6 is a block flow diagram summarizing a method 600 of manufacturing a product package with a security device.

FIG. 6 is a block flow diagram summarizing a method 600 of manufacturing a product package with a security device. At block 602 an RFID tag is disposed on a first portion of a product package. The RFID tag may be fixed to a surface of the product package or embedded within the material of the product package. The RFID tag includes and RFID tag antenna and an RFID integrated circuit. In some examples, the RFID tag antenna may be printed on the product package and the RFID integrated circuit 108 may be coupled to the printed RFID antenna. In some examples, the RFID tag, including the RFID antenna and RFID integrated circuit, are created as a discrete unit and coupled to the package together.

At block 604, a booster antenna is disposed on a second portion of the product package. The booster antenna may be printed on a surface of the product package. In some examples, the booster antenna is manufactured separately and coupled to the product package. For example, the booster antenna may be made from a metal foil with an adhesive backing that can be attached to the product package. The RFID tag and booster antenna are positioned on the product package so that the RFID tag will be electromagnetically coupled to the booster antenna when the product package is closed, and the RFID tag will be decoupled from the booster antenna when the product package is open.

At block 606, product may be inserted into the product packaging and the product packaging may be closed so that the RFID tag is electromagnetically coupled to the booster antenna. Fewer or greater actions can be included in the method 600 depending on the design considerations of a particular implementation.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the scope of the present techniques.

What is claimed is:

1. An RFID security apparatus for product packaging, comprising:
an RFID tag disposed on a first portion of a product package; and
a booster antenna disposed on a second portion of the product package;
wherein the RFID tag and booster antenna are positioned on the product package so that the RFID tag will be electromagnetically coupled to the booster antenna when the product package is closed, and the RFID tag will be decoupled from the booster antenna when the product package is open.

2. The RFID security apparatus of claim 1, wherein the booster antenna is printed on a surface of the product package.

3. The RFID security apparatus of claim 1, wherein the RFID tag is embedded within the material of the product package.

4. The RFID security apparatus of claim 1, wherein, when the product package is opened, the RFID tag remains operable with a reduced communication range compared to when the product package is closed.

5. The RFID security apparatus of claim 1, wherein the booster antenna is a dipole with bends that reduce a footprint of the booster antenna while maintaining a resonant length.

6. The RFID security apparatus of claim 1, wherein the booster antenna is a meander dipole with finger projections to increase coupling between the RFID tag and the booster antenna.

7. The RFID security apparatus of claim 1, wherein the first portion of the product package comprises a tab on which the RFID tag is disposed, the package further comprising a slot to receive the tab, the booster antenna being disposed at the slot on the second portion of the product package to couple with the RFID tag when the tab is inserted in the slot.

8. The RFID security apparatus of claim 7, wherein the slot is in, and the booster antenna is disposed on, a lid of the product package.

9. An RFID security system, comprising:
a product package comprising an RFID tag disposed on a first portion of the product package, and a booster antenna disposed on a second portion of the product package, wherein the RFID tag and booster antenna are positioned on the product package so that the RFID tag will be electromagnetically coupled to the booster antenna when the product package is closed, and the RFID tag will be decoupled from the booster antenna when the product package is open,
an RFID reader to communicate with the RFID tag while the product package is closed.

10. The RFID security apparatus of claim 9, wherein the booster antenna is printed on a surface of the product package.

11. The RFID security apparatus of claim 9, wherein, when the product package is closed, the RFID tag is fully or partially overlapped by the booster antenna.

12. The RFID security apparatus of claim 9, when the product package is opened, the RFID tag remains operable with a reduced communication range compared to when the product package is closed.

13. The RFID security apparatus of claim 9, wherein, when the product package is opened, the RFID reader loses communication with the RFID tag, and the RFID reader registers a tampering event in response to losing communication.

14. A method of manufacturing a product package with a security device, comprising:
disposing an RFID tag on a first portion of a product package;
disposing a booster antenna a second portion of the product package;
wherein the RFID tag and booster antenna are positioned on the product package so that the RFID tag will be electromagnetically coupled to the booster antenna when the product package is closed, and the RFID tag will be decoupled from the booster antenna when the product package is open.

15. The method of claim 14, wherein disposing the booster antenna on a first portion of a product package comprises printing the booster antenna on a surface of the product package.

16. The method of claim 14, wherein disposing an RFID tag on a first portion of a product package comprises embedding the RFID tag within the material of the product package.

17. The method of claim 14, wherein, when the product package is opened, the RFID tag remains operable with a reduced communication range compared to when the product package is closed.

18. The method of claim 14, wherein the RFID tag is to communicate with an RFID reader while the product package is closed, and the RFID reader losses communication with the RFID tag when the product package is opened.

19. The method of claim 18, further comprising:
- registering a loss of communication with the RFID tag as a tampering event; and
- issuing an alert to a staff member of the tampering event.

20. The method of claim 19, further comprising:
- when packaging is reclosed after a tampering event, resuming the previously lost communication with the RFID tag; and
- retaining a record of the tampering event to allow inspection of the package for product integrity.

* * * * *